United States Patent
Arimilli et al.

(10) Patent No.: US 6,408,362 B1
(45) Date of Patent: Jun. 18, 2002

(54) DATA PROCESSING SYSTEM, CACHE, AND METHOD THAT SELECT A CASTOUT VICTIM IN RESPONSE TO THE LATENCIES OF MEMORY COPIES OF CACHED DATA

(75) Inventors: Ravi Kumar Arimilli; Lakshminarayana Baba Arimilli; James Stephen Fields, Jr.; Sanjeev Ghai, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,402

(22) Filed: Jun. 24, 1999

(51) Int. Cl.$^7$ ............................................... G06F 12/00
(52) U.S. Cl. ...................................... 711/133; 711/141
(58) Field of Search ................................ 711/133, 160, 711/136, 159, 122, 135, 137, 141, 144, 145, 146, 154

(56) References Cited

U.S. PATENT DOCUMENTS

| | | | |
|---|---|---|---|
| 4,314,331 A | | 2/1982 | Porter et al. |
| 4,496,539 A | * | 1/1985 | Vosacek ................. 364/200 |
| 5,623,632 A | | 4/1997 | Liu et al. |
| 5,706,465 A | | 1/1998 | Kurokawa et al. |
| 5,787,471 A | * | 7/1998 | Inoue ..................... 711/133 |
| 5,895,486 A | * | 4/1999 | Patel ...................... 711/121 |
| 6,141,734 A | | 10/2000 | Razdan et al. |
| 6,154,816 A | | 11/2000 | Steely et al. |
| 6,173,364 B1 | | 1/2001 | Zenchelsky et al. |

OTHER PUBLICATIONS

U.S. application No. 09/339,403, Arimilli et al., filed Jun. 24, 1999.

\* cited by examiner

Primary Examiner—Matthew Kim
Assistant Examiner—Christian P. Chace
(74) Attorney, Agent, or Firm—Casimer K. Salys; Bracewell & Patterson, L.L.P.

(57) ABSTRACT

A data processing system includes a processing unit, a distributed memory including a local memory and a remote memory having differing access latencies, and a cache coupled to the processing unit and to the distributed memory. The cache includes a congruence class containing a plurality of cache lines and a plurality of latency indicators that each indicate an access latency to the distributed memory for a respective one of the cache lines. The cache further includes a cache controller that selects a cache line in the congruence class as a castout victim in response to the access latencies indicated by the plurality of latency indicators. In one preferred embodiment, the cache controller preferentially selects as castout victims cache lines having relatively short access latencies.

21 Claims, 3 Drawing Sheets

DATA PROCESSING SYSTEM, CACHE, AND METHOD THAT SELECT A CASTOUT VICTIM IN RESPONSE TO THE LATENCIES OF MEMORY COPIES OF CACHED DATA

CROSS REFERENCE TO RELATED APPLICATIONS

The present application is related to the following U.S. patent applications:

1. Ser. No. 08/839,557, filed on Apr. 14, 1997, now abandoned; and
2. Ser. No. 09/024,393, filed on Feb. 17, 1998.

All above-mentioned applications are assigned to the assignee of the present application.

BACKGROUND OF THE INVENTION

1. Technical Field

The present invention relates in general to data processing and, in particular, to a cache coherency protocol for a data processing system. Still more particularly, the present invention relates to a cache coherency protocol including one or more states that indicate the access latency of a memory copy of cached data in a data processing system.

2. Description of the Related Art

It is well-known in the computer arts that greater computer system performance can be achieved by harnessing the processing power of multiple processors in tandem. Multiprocessor (MP) computer systems can be designed with a number of different architectures, of which various ones may be better suited for particular applications depending upon the performance requirements and software environment of each application. One of the most common MP computer topologies is a symmetric multiprocessor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases.

In order to overcome scalability limitations of conventional symmetric multiprocessor (SMP) data processing systems and to improve access latency to system memory, some recent MP architectures distribute system memory within a computer system such that a processor's access paths and access latencies to data vary for different portions of the distributed system memory. The present invention recognizes that such non-symmetric architectures are also subject to a number of inefficiencies. In particular, the present invention recognizes that such non-symmetric architectures do not account for the varying access latencies among the various portions of the distributed system memory in implementing cache line deallocation and victim selection policies.

SUMMARY OF THE INVENTION

To overcome the above-noted and other shortcomings of the prior art, the present invention introduces the concept of storing, in association with cached data, an indication of the access latency of a memory copy of the cached data.

A data processing system in accordance with the present invention includes a processing unit, a distributed memory including a local memory and a remote memory having differing access latencies, and a cache coupled to the processing unit and to the distributed memory. The cache includes a congruence class containing a plurality of cache lines and a plurality of latency indicators that each indicate an access latency to the distributed memory for a respective one of the cache lines. The cache further includes a cache controller that selects a cache line in the congruence class as a castout victim in response to the access latencies indicated by the plurality of latency indicators. In one preferred embodiment, the cache controller preferentially selects as castout victims cache lines having relatively short access latencies.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Architecture

Figure 1:
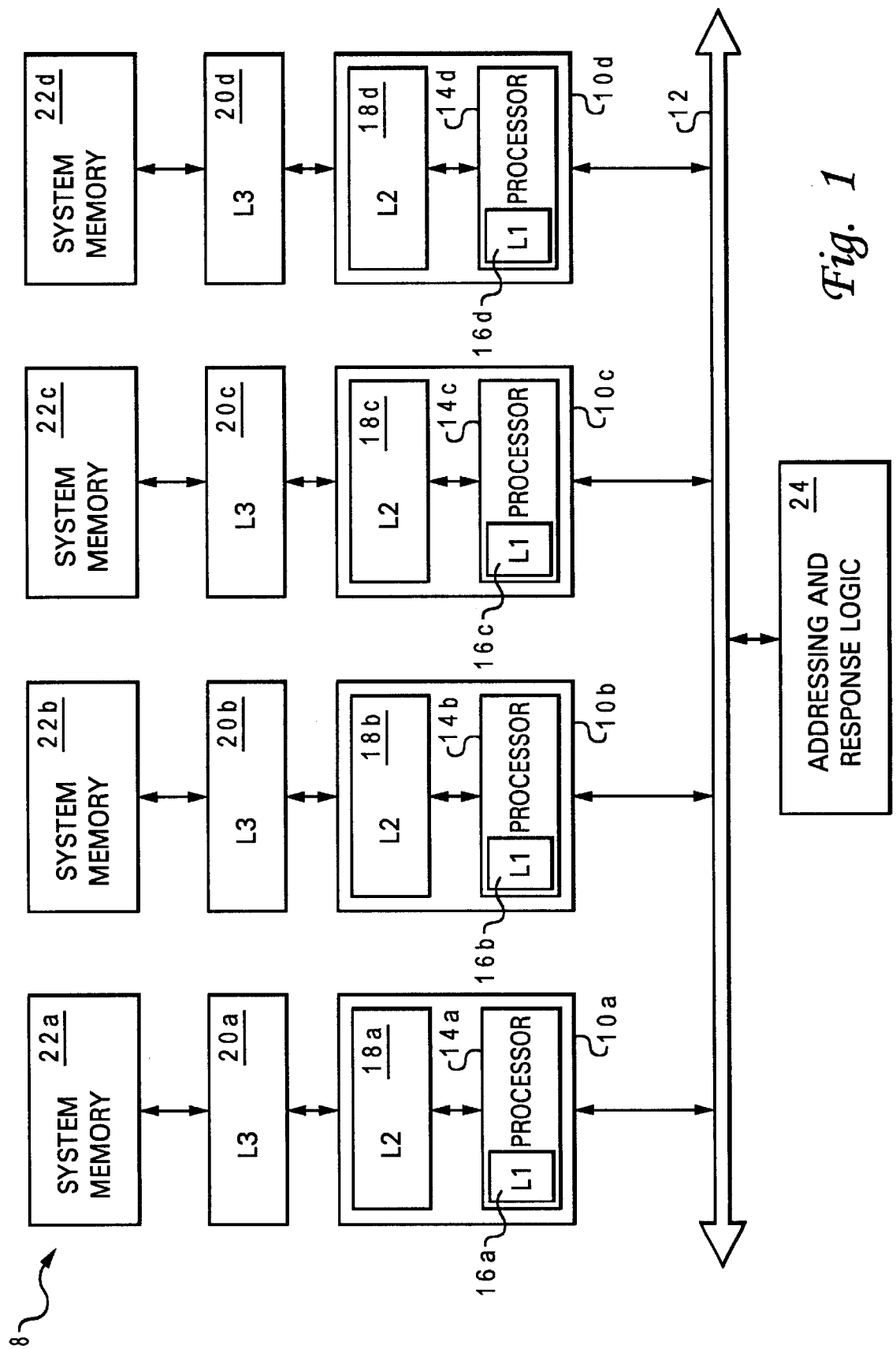
FIG. 1 depicts a first illustrative embodiment of a non-symmetric multiprocessor data processing system with which the present invention may advantageously be utilized.

With reference now to the figures and in particular with reference to FIG. 1, there is illustrated a high level block diagram of a first non-symmetric multiprocessor data processing system in accordance with the present invention. As depicted, data processing system 8 includes a number of processing units 10a–10d, which each comprise an integrated circuit including one or more processors 14. In addition to the registers, instruction flow logic and execution units utilized to execute program instructions, each of processors 14 also includes an associated level one (L1) cache 16, which temporarily stores instructions and data that are likely to be accessed by that processor 14. Although L1 caches 16 are illustrated in FIG. 1 as unified caches that store both instruction and data (both referred to hereinafter simply as data), those skilled in the art will appreciate that each of L1 caches 16 could alternatively be implemented as bifurcated instruction and data caches.

As further illustrated in FIG. 1, the memory hierarchy of data processing system 8 also includes distributed system memories 22, which together form the lowest level of volatile data storage in the memory hierarchy, and one or more lower levels of cache memory, such as on-chip level two (L2) caches 18 and off-chip L3 caches 20, which are utilized to stage data from system memories 22 to processors 14. As understood by those skilled in the art, each succeeding lower level of the memory hierarchy is typically capable of storing a larger amount of data than higher levels, but at a higher access latency. For example, in an exemplary embodiment, L1 caches 16 may each have 512 64-byte cache lines for a total storage capacity of 32 kilobytes (kB), all at single cycle latency. L2 caches 18 may each have 2048 128-byte cache lines for a total storage capacity of 256 kB at approximately 10 cycle latency. L3 caches 20 may each have 4096 256-byte cache lines for a total storage capacity of 1 MB, at a latency of approximately 40–60 cycles to the local processor 14. Finally, each system memory 22 can store tens or hundreds of megabytes of data at an even longer latency, for example, 300 cycles to a local system memory 22 and 450 cycles to a remote system memory 22. Given the large disparity in access latencies between local and remote system memories 22, it is advantageous to reduce the number of accesses to remote system memories and to reduce the access latency when accesses to remote system memories 22 are required.

Processing units 10a–10d are each connected to a system interconnect 12, which serves as a conduit for communication transactions between processing units 10 (and any other snoopers that may be coupled to system interconnect 12). Although in a preferred embodiment system interconnect 12 comprises a chipset implementing a cross-point switch, in other embodiments system interconnect 12 can alternatively or additionally be implemented with one or more system buses.

As further depicted in FIG. 1, integral to or coupled to system interconnect 12 is centralized addressing and response logic 24. Addressing and response logic 24 maintains a system memory directory (not illustrated) indicating which system memory addresses correspond to the storage locations in each of system memories 22a–22d. In addition, addressing and response logic 24 contains response logic that compiles snoop responses by processing units 10 to requests on system interconnect 12 and provides to processing units 10 a combined response that indicates to each processing unit 10 what action, if any, it should take in response to the request and the identity of the processing unit 10 interposed between system interconnect 12 and the system memory 22 having the address specified in the request. Although providing centralized addressing logic in this manner is advantageous in terms of reducing the amount of duplicate circuitry and therefore cost of data processing system 8, the centralization of addressing logic contributes to the latency of memory access transactions. Thus, those skilled in the art will appreciate that in alternative embodiments of the present invention, each processing unit 10 can be equipped with its own respective system memory address range registers or other means for determining appropriate addressing and routing for requests targeting system memory addresses.

Those skilled in the art will also appreciate that data processing system 8 can include many additional components, such as bridges to additional interconnects, devices, non-volatile storage, ports for connection to networks or attached devices, etc. Because such additional components are not necessary for an understanding of the present invention, they are not illustrated in FIG. 1 or discussed further herein.

Cache Architecture

Figure 2:
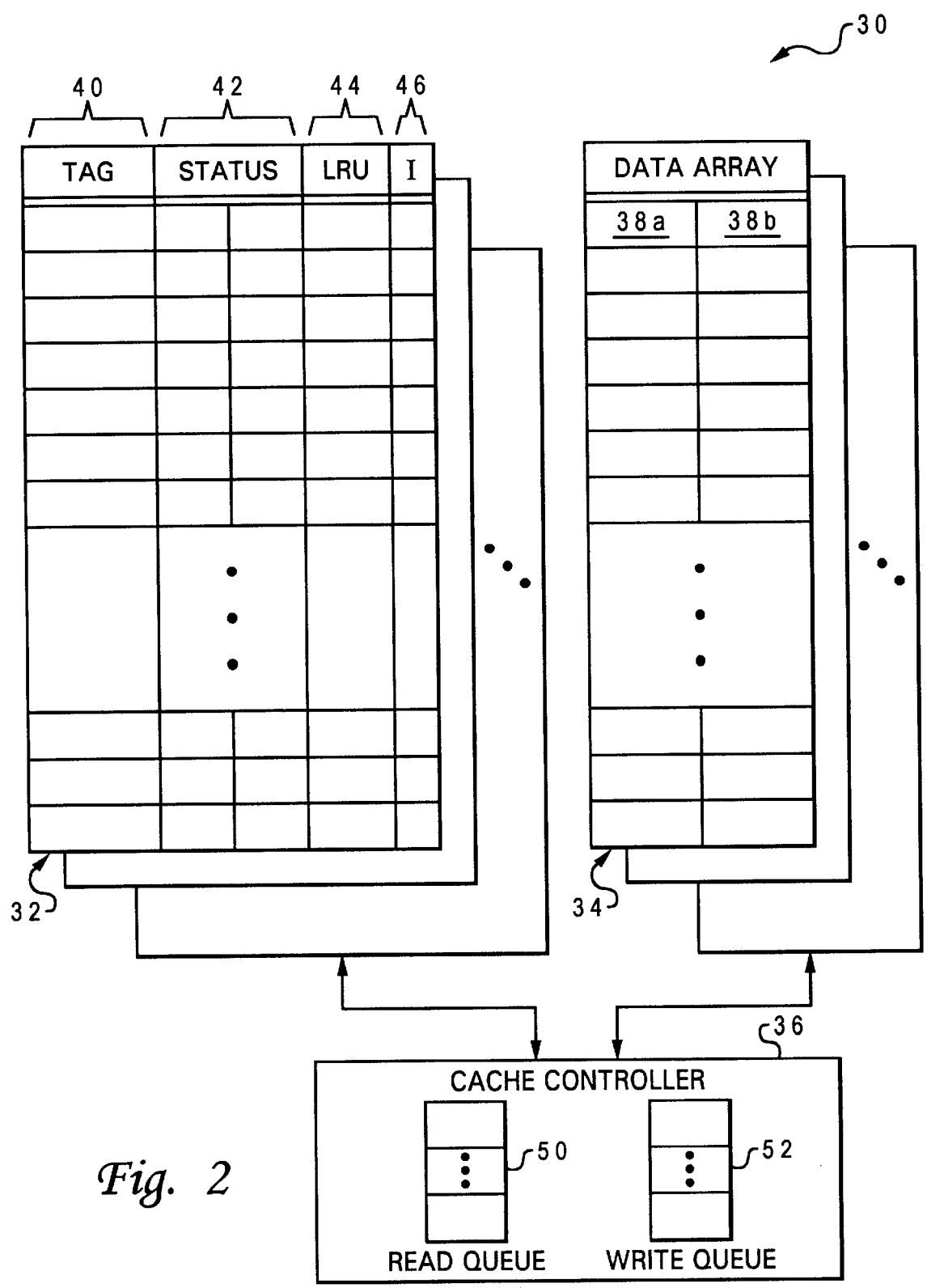
FIG. 2 illustrates an exemplary embodiment of a cache in accordance with the present invention.

With reference now to FIG. 2, there is depicted a more detailed block diagram of an illustrative embodiment of a cache 30 that may be utilized to implement any of L1 caches 16, L2 caches 18 and L3 caches 20 in accordance with the present invention. In the illustrative embodiment, cache 30 is a eight-way set associative cache including a directory 32, a data array 34, and a cache controller 36. Accordingly, data array 34 of cache 30 comprises a number of congruence classes that each contain eight ways for storing cache lines. As in conventional set associative caches, memory locations in system memories 22 are mapped to particular congruence classes within data array 34 utilizing predetermined index bits within the system memory address.

As further shown in FIG. 2, each cache line within data array 34 is sectored into two sectors 38a, 38b that can be individually accessed and modified. Although not required by the present invention, it is convenient if the sector size utilized by each cache is the same as the cache line size of the associated higher level cache, if any. For example, if L1 caches 16 have 64-byte cache lines, L2 caches 18 and L3 caches 20 preferably implement 128-byte (two 64-byte sectors) and 256-byte (two 128-byte sectors) cache lines, respectively.

The cache lines stored within data array 34 are recorded in cache directory 32, which contains one directory entry for each way in data array 34. Each directory entry comprises a tag field 40, a status field 42, a least recently used (LRU) field 44, and an inclusion field 46. Tag field 40 specifies which cache line is stored in the corresponding way of data array 34 by storing the tag bits of the system memory address of the cache line. As described below, status field 42 separately indicates the coherency state of each sector of the cache line stored in the corresponding way of data array 34 utilizing predefined bit combinations. Finally, LRU field 44 indicates how recently the corresponding way of data array 34 has been accessed relative to the other ways of its congruence class, and inclusion field 46 indicates whether or not each sector of the cache line stored in the corresponding way of data array 34 is also stored in the local memory unit (i.e., cache or system memory) at the next lowest level of the memory hierarchy.

Still referring to FIG. 2, cache controller 36 manages all storage and retrieval of data within data array 34 and updates to cache directory 32 in response to signals received from the associated components of the memory hierarchy and transactions snooped on system interconnect 12. As illustrated, cache controller 36 maintains a read queue 50 and a write queue 52 from which cache controller 36 performs updates to cache directory 32 and accesses to data array 34.

Cache Coherence Protocol

To maintain coherency, that is, to provide a consistent view of the contents of system memories 22 to processors 14a–14d, the cache controller 36 of each cache in data processing system 8 implements a coherence protocol. The selected coherence protocol can be any protocol, such as the conventional MESI (Modified, Exclusive, Shared, Invalid) protocol or a variant thereof. Variants of the MESI protocol that may be employed include the T-MESI protocol, which includes a second modified state (T) for possibly shared, non-memory-consistent data, and the R-MESI protocol, which includes a second shared state (R) from which a cache can source non-modified shared data. The R-MESI and T-MESI coherence protocols are described, for example, in U.S. application Ser. Nos. 08/839,557 and 09/024,393, respectively, which are incorporated herein by reference.

Latency Indicators

In accordance with a preferred embodiment of the present invention, the cache state of at least modified data (e.g., data in T or M state) is augmented with one or more bits that function as a latency indicator that indicates whether data corresponding to the cached data are resident in the local system memory 22 or in a remote system memory 22. Thus, modified data cached in L3 cache 20a that is associated with a memory address in system memory 22a may be designated as $M_L$ or $T_L$ to indicate "local" system memory having relatively lower latency, and modified data cached in L3 cache 20a that is associated with a memory address in system memory 22b may be designated as $M_R$ or $T_R$ to indicate "remote" system memory having relatively higher latency. Shared and exclusive data may similarly be designated as belonging to a local or remote system memory by the $E_L$, $S_L$ or $R_L$ and $E_R$, $S_R$ or $R_R$ states, respectively.

Advantageously, cache controllers 36 automatically obtain latency information for cached data upon receipt of the data without making additional queries to addressing and response logic 24 or performing address range compares against a set of system memory address range registers. That is, in the illustrated embodiment, L3 caches 20 "know" that data should be associated with a coherency state having a "local" latency indicator if the data is retrieved from the attached system memory 22 and can therefore store such data with a "local" coherency indicator or supply the "local" coherency indicator to the associated L2 cache 18 with the data. Similarly, an L2 cache 18 can ascertain from the combined response supplied by addressing and response logic 24 whether data received in a transaction is from a local or remote system memory 22.

The availability of latency indicators in cache permits a number of enhancements in the operation of caches 16, 18 and 20, and of data processing system 8 as a whole. First, when an L2 cache 18 or an L3 cache 20 is required to writeback modified data to a system memory 22, the cache directory 32 already contains the routing information required for cache controller 36 to determine whether the writeback transaction should be directed to the local system memory 22 or should be sourced on system interconnect 12. Thus, no memory directory lookup or address range compares need be performed prior to the cache issuing the writeback transaction.

Second, in the event that a cache must perform a castout operation, the latency indicators can be utilized to implement an intelligent victim selection policy for identifying the cache line within a congruence class to be replaced. For example, because the latency penalty incurred for re-fetching data from a remote system memory 22 is greater than the latency penalty for re-fetching from local system memory 22, overall system performance can often be improved if cache lines storing data from local system memory 22 are preferentially selected as victims for eviction. One exemplary implementation of a victim selection policy for an eight-way set-associative cache that accounts for the access latency of memory data is as follows:

(1) if one of the four least-recently-used entries in a congruence class has a "local" latency indicator, then select that entry as the victim;

(2) if more than one of the four least-recently-used entries has a "local" latency indicator, then select the least-recently-used among such entries as the victim; and (3) if none of the four least-recently-used entries has a "local" latency indicator, then select the least-recently-used entry as the victim.

Of course, if the workload of data processing system 8 is highly tuned to optimize the locality of data to the processor accessing them, such that the probability of multiple references to a cache line containing data from a remote system memory 22 is small, it would be advantageous to preferentially select cache lines containing data from a remote system memory 22 as victims for eviction.

Third, when a cache line is deallocated from an L2 cache 18, for example, during a writeback or castout operation, the access latency of a memory copy of the cache line may be taken into consideration when determining whether or not to allocate a line to store the cache line in the associated L3 cache 20. For example, one cache deallocation/allocation policy would be to always allocate a cache line in an L3 cache 20 to hold a deallocated L2 cache line if the associated latency indicator is "remote" and to not allocate an L3 cache line if the latency indicator is "local."

Figure 3:
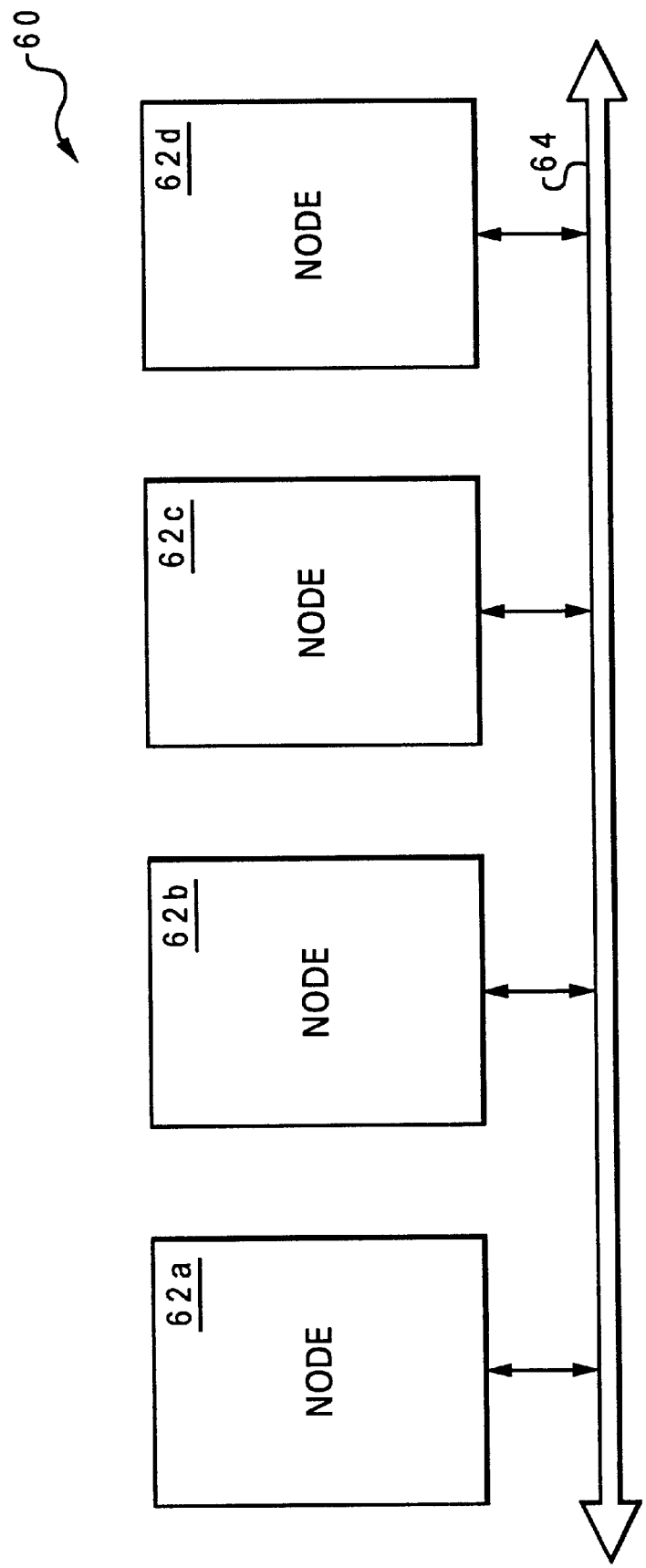
FIG. 3 depicts a second illustrative embodiment of a non-symmetric multiprocessor data processing system with which the present invention may advantageously be utilized.

The concept of storing a latency indicator in association with cached data as described above can be extended in a number of ways. First, the latency indicator may be made more specific than "local" and "remote" and can specifically designate the system memory to which the cached data belongs or an ID of a processing unit associated with the system memory. Second, the latency indicators can indicate additional levels of access latency. For example, FIG. 3 illustrates a hierarchical multiprocessor data processing system 60 in which multiple nodes 62, which each comprise a data processing system 8 as shown in FIG. 1, are coupled together by an interconnect 64. In such a hierarchical architecture, the latency indicators associated with cached data can indicate "local" for data associated with memory addresses in the local system memory, "in node" for data associated with addresses in non-local system memory in the same node, and "remote" for data associated with addresses in system memory in another node.

As has been described, the present invention provides an improved cache, data processing system, and method of cache management in which latency indicators, which preferably form a portion of a cache coherency state, are stored in association with cached data. These latency indicators, which indicate an access latency to corresponding data in a distributed system memory, can be utilized by the cache hierarchy to provide addressing and routing information for transactions and to implement intelligent victim selection and line deallocation policies.

While the invention has been particularly shown and described with reference to a preferred embodiment, it will be understood by those skilled in the art that various changes in form and detail may be made therein without departing from the spirit and scope of the invention.

What is claimed is:

1. A cache for a data processing system having a distributed memory including a local memory and a remote memory having differing access latencies, said cache comprising:
   a congruence class containing a plurality of cache lines;
   a plurality of state fields that each indicate a coherence state of a respective one of said plurality of cache lines, wherein at least a subset of said plurality of state fields contains a plurality of latency indicators that each indicate an access latency to the distributed memory for a respective one of said plurality of cache lines; and
   a cache controller that selects a castout victim from among said plurality of cache lines in said congruence class in response to access latencies indicated by said plurality of state fields.

2. The cache of claim 1, said cache further including at least one usage indicator indicating how recently cache lines among said plurality of cache lines have been accessed, wherein said cache controller further selects said castout victim in response to said usage indicator.

3. The cache of claim 1, wherein said cache controller preferentially selects as said castout victim a cache line among said plurality of cache lines having an associated latency indicator that indicates a relatively short access latency.

4. The cache of claim 1, wherein said cache controller preferentially selects as said castout victim a cache line among said plurality of cache lines having an associated latency indicator that indicates a relatively long access latency.

5. The cache of claim 1, wherein said cache controller routes a transaction for particular data to one of the local memory and the remote memory in response to a latency indicator among said plurality of latency indicators associated with said particular data.

6. The cache of claim 1, said plurality of latency indicators having at least three possible states that each indicate a respective one of three different access latencies.

7. The cache of claim 1, wherein said cache is a lower level cache and the data processing system includes an upper level cache, wherein said cache controller, in response to receiving from the upper level cache a deallocated cache line having an associated latency indicator, determines whether to allocate a cache line to store said deallocated cache line in response to said latency indicator.

8. A data processing system, comprising:
   a processing unit;
   a distributed memory including a local memory and a remote memory having differing access latencies; and
   a cache coupled to said processing unit and to said distributed memory, said cache including:
      a congruence class containing a plurality of cache lines;
      a plurality of state fields that each indicate a coherence state of a respective one of said plurality of cache lines, wherein at least a subset of said plurality of state fields contains a plurality of latency indicators that each indicate an access latency to the distributed memory for a respective one of said plurality of cache lines; and
      a cache controller that selects a castout victim from among said plurality of cache lines in said congruence class in response to access latencies indicated by said plurality of state fields.

9. The data processing system of claim 8, cache further including at least one usage indicator indicating how recently cache lines among said plurality of cache lines have been accessed, wherein said cache controller further selects said castout victim in response to said usage indicator.

10. The data processing system of claim 8, wherein said cache controller preferentially selects a said castout victim a cache line among said plurality of cache lines having an associated latency indicator that indicates a relatively short access latency.

11. The data processing system of claim 8, wherein said cache controller preferentially selects as said castout victim a cache line among said plurality of cache lines having an associated latency indicator that indicates a relatively long access latency.

12. The data processing system of claim 8, wherein said cache controller routes a transaction for particular data to one of the local memory and the remote memory in response to a latency indicator among said plurality of latency indicators associated with said particular data.

13. The data processing system of claim 8, said plurality of latency indicators having at least three possible states that each indicate a respective one of three different access latencies.

14. A data processing system, comprising:
   a processing unit;
   a distributed memory including a local memory and a remote memory having differing access latencies; and
   an upper level cache associated with the processing unit;
   a lower level cache coupled to said upper level cache and to said distributed memory, said lower level cache including:
      a congruence class containing a plurality of cache lines;
      a plurality of latency indicators that each indicate an access latency to the distributed memory for a respective one of said plurality of cache lines; and
      a cache controller that selects a castout victim from among said plurality of cache lines in said congruence class in response to access latencies indicated by said plurality of latency indicators, wherein said cache controller, in response to receiving from the upper level cache a deallocated cache line having an associated latency indicator, determines whether to allocate a cache line to store said deallocated cache line in response to said associated latency indicator.

15. A method for maintaining latency information in a data processing system having a cache and a distributed memory including a local memory and a remote memory having differing access latencies, said method comprising:
   storing data from the distributed memory in a plurality of cache lines forming a congruence of the cache; and maintaining, in the cache, a plurality of latency indicators that each indicate an access latency to the distributed memory for a respective one of said plurality of cache lines; and selecting a castout victim from among said plurality of cache lines and replacing said castout victim, wherein said castout victim is selected in response to access latencies indicated by said plurality of latency indicators.

16. The method of claim 15, said cache further including at least one usage indicator indicating how recently cache lines among said plurality of cache lines have been accessed, wherein selecting said castout victim further comprises selecting said castout victim in response to said usage indicator.

17. The method of claim 15, wherein selecting said castout victim comprises preferentially selecting as said castout victim a cache line among said plurality of cache lines having an associated latency indicator that indicates a relatively short access latency.

18. The method of claim 15, wherein selecting said castout victim comprises preferentially selecting as said castout victim a cache line among said plurality of cache lines having an associated latency indicator that indicates a relatively long access latency.

19. The method of claim 15, and further comprising routing a transaction for particular data to one of the local memory and the remote memory in response to a latency indicator among said plurality of latency indicators associated with said particular data.

20. The method of claim 15, wherein said plurality of latency indicators each have at least three possible states that each indicate a respective one of three different access latencies.

21. The method of claim 15, wherein said cache is a lower level cache and the data processing system includes an upper level cache, said method further comprising:

in response to said lower level cache receiving from the upper level cache a deallocated cache line having an associated latency indicator, selectively allocating a cache line to store said deallocated cache line in response to said latency indicator.

* * * * *

UNITED STATES PATENT AND TRADEMARK OFFICE
CERTIFICATE OF CORRECTION

PATENT NO. : 6,408,362 B1  
DATED : June 18, 2002  
INVENTOR(S) : Arimilli et al.

It is certified that error appears in the above-identified patent and that said Letters Patent is hereby corrected as shown below:

Column 7,  
Lines 56 through 62, please replace the entire paragraph with:

-- 7. A lower level cache for a data processing system having an upper level cache and a distributed memory including a local memory and a remote memory having differing access latencies, said cache comprising:
  a congruence class containing a plurality of cache lines;
  a plurality of latency indicators that each indicate an access latency to the distributed memory for a respective one of said plurality of cache lines; and
  a cache controller that selects a castout victim from among said plurality of cache lines in said congruence class in response to access latencies indicated by said plurality of latency indicators, wherein said cache controller, in response to receiving from the upper level cache a deallocated cache line having an associated latency indicator, determines whether to allocate a cache line to store said deallocated cache line in response to said associated latency indicator. --.

Column 8,  
Lines 61 through 66, ending on Column 9, lines 1 through 9, please replace the entire paragraph with:

-- 15. A method for maintaining latency information in a data processing system having a cache and a distributed memory including a local memory and a remote memory having differing access latencies, said method comprising:
  storing data from the distributed memory in a plurality of cache lines forming a congruence of the cache; and
  maintaining, in the cache, a plurality of state fields that each indicate a coherence state of a respective one of said plurality of cache lines, wherein at least a subset of said plurality of state fields contains a plurality of latency indicators that each indicate an access latency to the distributed memory for a respective one of said plurality of cache lines; and
  selecting a castout victim from among said plurality of cache lines and replacing said castout victim, wherein said castout victim is selected in response to access latencies indicated by said plurality of state fields. --.

UNITED STATES PATENT AND TRADEMARK OFFICE
CERTIFICATE OF CORRECTION

PATENT NO. : 6,408,362 B1
DATED : June 18, 2002
INVENTOR(S) : Arimilli et al.

It is certified that error appears in the above-identified patent and that said Letters Patent is hereby corrected as shown below:

Column 10,
Lines 14 through 21, please replace the entire paragraph with:

-- 21. A method for maintaining latency information in a data processing system having upper and lower level caches and a distributed memory including a local memory and a remote memory having differing access latencies, said method comprising:
storing data from the distributed memory in a plurality of cache lines forming a congruence of the cache; and
maintaining, in the cache, a plurality of latency indicators that each indicate an access latency to the distributed memory for a respective one of said plurality of cache lines;
selecting a castout victim from among said plurality of cache lines and replacing said castout victim, wherein said castout victim is selected in response to access latencies indicated by said plurality of latency indicators;
in response to said lower level cache receiving from the upper level cache a deallocated cache line having an associated latency indicator, selectively allocating a cache line to store said deallocated cache line in response to said associated latency indicator.--.

Signed and Sealed this

Eighteenth Day of February, 2003

JAMES E. ROGAN
*Director of the United States Patent and Trademark Office*